Figure 1:
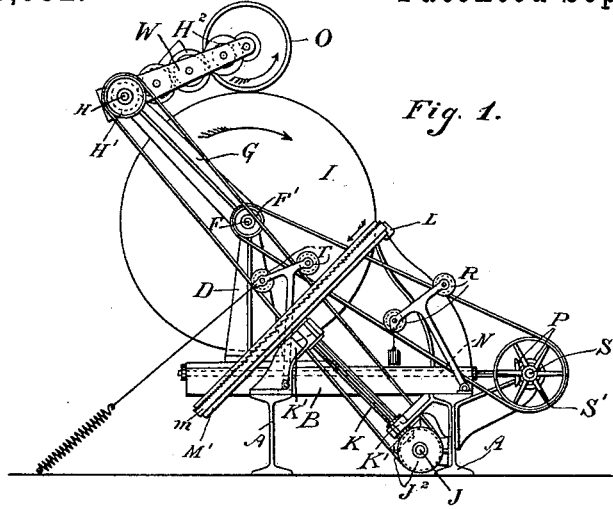

(No Model.) 2 Sheets—Sheet 1.

J. E. GOODWIN.
PROCESS OF MANUFACTURING FROM WOOD EXCELSIOR AND MATERIAL FOR WOOD PULP.

No. 349,992. Patented Sept. 28, 1886.

WITNESSES:
P. H. F. Mason.
J. I. Veeder

INVENTOR.
Jno E. Goodwin
BY W. G. Rainey
ATTORNEY.

(No Model.) 2 Sheets—Sheet 2.
J. E. GOODWIN.
PROCESS OF MANUFACTURING FROM WOOD EXCELSIOR AND MATERIAL FOR WOOD PULP.
No. 349,992. Patented Sept. 28, 1886.
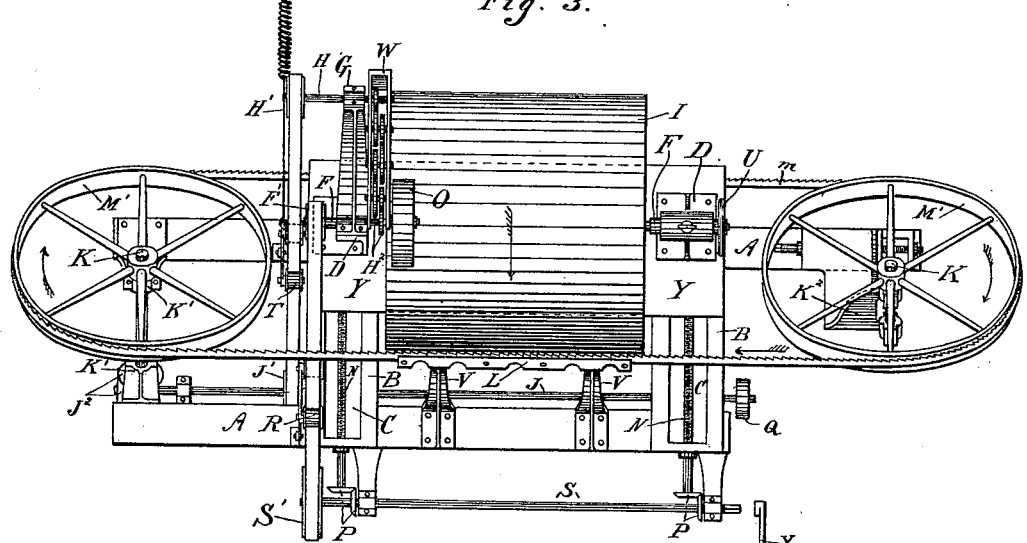
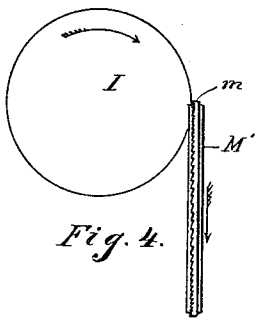
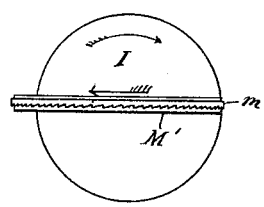
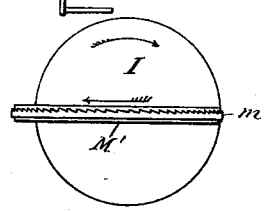
Fig. 4. Fig. 6. Fig. 5.
WITNESSES:
INVENTOR
BY
ATTORNEY.

UNITED STATES PATENT OFFICE.

JOHN E. GOODWIN, OF MEMPHIS, TENNESSEE.

PROCESS OF MANUFACTURING FROM WOOD EXCELSIOR AND MATERIAL FOR WOOD PULP.

SPECIFICATION forming part of Letters Patent No. 349,992, dated September 28, 1886.

Application filed December 11, 1885. Serial No. 185,399. (No model.)

*To all whom it may concern:*

Be it known that I, JOHN E. GOODWIN, of Memphis, in the county of Shelby and State of Tennessee, have invented a new and useful Process of Manufacturing from Wood Excelsior and Material for Making Wood Pulp and such Kindred Purposes, of which the following is a specification.

The object of my invention is to devise a means of extracting the fiber of wood for use, as excelsior, in the filling of mattresses or other like purposes, or for use in making wood pulp for paper, or for any other purpose for which commercial demands may find it available, and to do this without making a kerf. Heretofore there have been in use divers machines for making these substances, the most efficient of which have been by using knives or keen-edged tools, and operated by various devices for parting the fiber of the wood longitudinally first and planing it away. This has served to produce an inferior and costly product, so that the fiber is itself severed and rendered brittle and weak. Besides, by all previously-known methods in making these articles, there has necessarily been a great loss and waste in the timber; but by my process I extract a superior article, more economically made as respects the waste of timber, and the product is more tenacious, more pliable, and of longer fiber.

The chief feature of my invention is to present the surface of a revolving bolt of wood, from which the excelsior or fiber for making wood pulp is to be made, to the cutting-edge of a saw having the direction of its motion at right angles with the direction of the motion of the revolving bolt and lengthwise the grain or fiber of the wood, so as to pare away or peel the surface in comminuted shreds. The angle that the cutting-edge of the saw presents to the surface of the timber may be varied, but is more efficient at forty-five degrees from the radial line, and while the direction of the motion of the saw is always at right angles to the direction of the motion of the timber or lathe in which it revolves, the position of the saw may be either horizontal, vertical, or oblique; and if horizontal, the cutting edge or teeth may be turned either upward or downward, as may be best calculated to get the grade of excelsior or fiber wanted.

Figure 2:
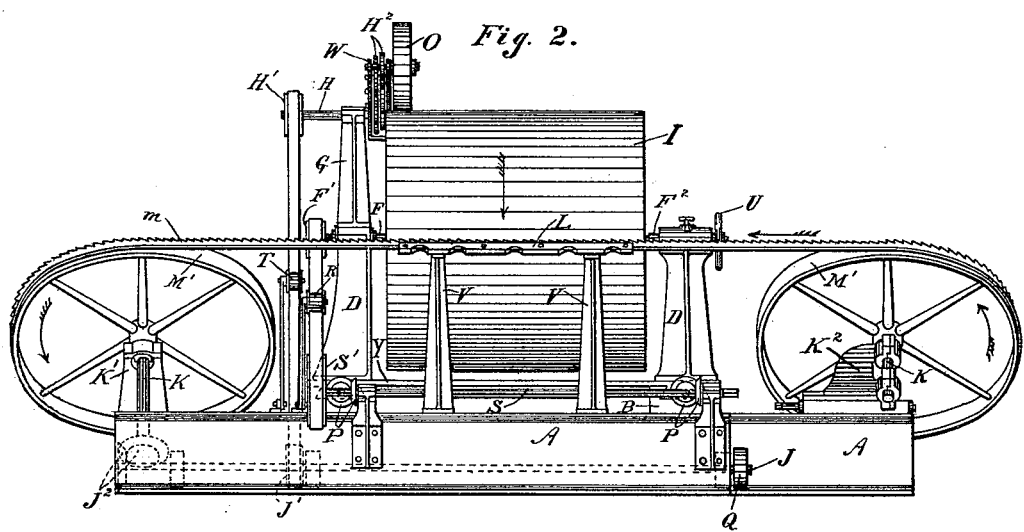

It is well known that all kinds of wood grow concentrically or from within by rings added yearly, with the fiber running longitudinally, having a tendency to be spiral. It is also well known that if wood be lying horizontally and moving longitudinally, and be cut by a saw perpendicularly, either with or across the grain, sawdust will be produced. This is especially the case when a muley or circular saw is used. Should a band-saw be used when sawing longitudinally with the grain when making a kerf, some of the cuttings will be of a fibrous nature; but when the band-saw is made to run lengthwise and parallel with the wood as it lies horizontally, making no kerf, the refuse or cuttings will be almost entirely of a fibrous nature. In my invention the saw is designed not to make a kerf; but it is designed to pare away the fiber without cutting into the wood, thereby reducing to a minimum the chance of destroying the wood-cells. I design to drive the saw lengthwise the timber, the motion of the saw being parallel, or as nearly as may be, with the grain of the timber, the timber revolving at right angles to the motion of the saw. It is obvious that when the saw is so used, the timber revolving at right angles to the line of its motion, the saw will cut the timber on the line of and nearly parallel with the growth of the fiber and somewhat spirally, and consequently cut the greatest possible percentage of excelsior or fiber for wood pulp, or such other purposes as the demands of commerce may find available—in fact, paring away or extracting the actual fiber of the wood entirely, the only loss being the small percentage of wood which is not of a fibrous nature, and which goes to sawdust. I prefer a band-saw, but do not wish to be confined to a band-saw, as similar results can be secured by using different kinds of saws, but in an inferior degree; nor do I wish to be confined to the horizontal position of the machine, because an equivalent result would be got from operating the latter perpendicularly upon its axis, and the saw being driven parallel thereto would have a perpendicular motion also. I have also invented a new machine by which this process is worked, and which is made the subject-matter of a separate application and filed contemporaneously herewith, which I prefer as the best known means to carry this invention into effect, and which is specifically set forth and described as follows:

Referring to the accompanying drawings, Figure 1 represents an end view of my machine. Fig. 2 represents a front view of the same. Fig. 3 represents a plan view of the same. Figs. 4, 5, and 6 show modifications in the relative positions of the saw and the timber, the saw being shown as either vertical, horizontal with the teeth turned upward, or horizontal with the teeth turned downward, respectively, in each figure.

A A are I-beams, on which rests the bed-plate B, which constitute the frame. The construction of this frame may be varied without departing from the character of the invention, the object being to make it strong, convenient, and durable.

B B are upright brackets or bearings, which slide in the grooved ways C C as they are drawn up to or driven back from the saw by the screws M N.

F $F^2$ are spindles operated in the bearings of the brackets D D. Upon these spindles is held suspended the log or bolt I which is to be worked into fiber, and the spindle $F^2$ is adjustable in and out by the hand-wheel U, to enable bolts of different lengths to be worked.

G is an arm of the bracket D, for the purpose of supplying a suitable bearing for the journal H, from which is suspended the swinging frame or yoke W, carrying the gear-wheels $H^2$, of suitable diameters and powers to drive the friction-pulley O at the proper speed. This frame, with its various wheels, should be heavy enough to furnish sufficient power or traction to the pulley O, as it bears on the log I, to drive it. The shaft H is driven by a belt running from the driving-pulley J' on the shaft J over the driven pulley H', and this belt is held taut, as the lathe moves in the grooves C C, by the idler T.

S is the shaft, driven by the belt running from the pulley F' over the driven pulley S', and held taut by the idler R as the latter is moved in the grooves C C. This shaft has bevel-geared wheels P P, which actuate the screws N N. These details constitute the lathe.

K K are the shafts upon which are driven the pulleys M' M'. They have their proper bearings K' $K^2$, and the driven pulley M' is fitted with an adjustable screw box or bearing, $K^2$, for taking up the slack of the saw and adjusting its tension. The band-saw $m$ is driven over the pulleys M' M', and has a guide-bar, L, with slotted grooves and wheels, for guiding the saw, and it is supported by upright arms V.

J is a shaft carrying the bevel-geared wheels $J^2$ $J^2$, which drive the band-saw. These details constitute the band-saw. The motion of the saw is united with that of the lathe by means of a belt driven by the pulley J' on the shaft J over the pulley H' on the shaft H. This shaft H conveys motion to the friction-pulley O, reduced to the proper speed by the intermediate gearing, $H^2$. Now, the relation that the diameter of the friction-pulley O bears to the diameter of the log or bolt I determines the speed at which the log or bolt I revolves. As the diameter of the log or bolt I is diminished by the action of the saw $m$, the speed increases, and the spindle F is driven proportionately faster, communicating thus the gradually-increasing speed to the driven pulley S', thence to the screws N N, by which the feed is accelerated as the log or bolt is pared away.

X is a crank for use in bringing the timber, log, or bolt up to the saw before starting the machine and reversing the feed after the log or bolt I is reduced to its least possible diameter. When the timber is brought in contact with the saw, the same area of surface is presented at all periods of the work by the mechanism just described. The saw is driven at as high a rate of speed as may be desired, and as the lathe is revolved at a speed relatively much slower, the relation the speed of one bears to that of the other may be varied as desired, and as the relative speed is altered, so is the quality of the fiber changed from fine to coarse, and vice versa.

Having now fully described my invention, what I claim as new, and desire to secure by Letters Patent, is—

1. The herein-described process or method of reducing wood to excelsior and material for wood pulp, consisting in simultaneously cutting the timber along its entire length and in a plane parallel, or nearly so, with the fiber or grain of the wood without making a kerf, substantially as herein described.

2. The herein-described process or method of reducing wood to excelsior and material for wood pulp, the same consisting in revolving the wood in a direction at a right angle to the direction of the motion of the saw, substantially in the manner herein set forth.

3. The herein-described process of making excelsior and material for wood pulp from the wood by cutting the timber parallel, or nearly so, with the fiber or grain of the wood, by revolving the timber at right angles to the direction of the motion of the saw and without cutting a kerf, substantially as set forth.

JOHN E. GOODWIN.

Witnesses:
JAS. MORRISON,
B. F. FIELDS, Jr.